(12) United States Patent
Tozuka et al.

(10) Patent No.: US 6,562,455 B2
(45) Date of Patent: May 13, 2003

(54) SELF-ADHESIVE TAPE AND METHOD OF USE THEREOF

(75) Inventors: Toshiaki Tozuka, Saitama (JP); Tomishi Shibano, Saitama (JP); Fujio Taniwaki, Saitama (JP)

(73) Assignee: Lintec Corporation, Tokyo (JP)

( * ) Notice: Subject to any disclaimer, the term of this patent is extended or adjusted under 35 U.S.C. 154(b) by 58 days.

(21) Appl. No.: 09/851,110

(22) Filed: May 9, 2001

(65) Prior Publication Data

US 2001/0041261 A1 Nov. 15, 2001

(30) Foreign Application Priority Data

May 10, 2000 (JP) .................................. 2000-137818

(51) Int. Cl.$^7$ ................................................. B32B 7/12
(52) U.S. Cl. .......................... 428/355 R; 428/355 RA; 428/355 N; 156/70
(58) Field of Search ................ 428/355 N, 355 R, 428/355 RA; 427/209, 445; 156/70

(56) References Cited

U.S. PATENT DOCUMENTS 5,683,805 A * 11/1997 Oita et al. .................. 428/343

FOREIGN PATENT DOCUMENTS

EP 0 826 542 A2 3/1998

OTHER PUBLICATIONS

Database WPI, Section Ch, Week 198215, Derwent Publications Ltd., London, GB; Class A23, AN 1982–29943E, XP002190908, & JP 57 040578 A (Toray Ind Inc), Mar. 6, 1982.

* cited by examiner

Primary Examiner—James J. Seidleck
Assistant Examiner—Melanie Bissett
(74) Attorney, Agent, or Firm—Sughrue Mion, PLLC

(57) ABSTRACT

There is provided a self-adhesive tape having adhesive layer comprising at least one adhesive selected from the group of polyurethane adhesives and polyester adhesives, and having ball tackiness value of not more than 3, adhesive strength value to stainless steel board in JIS Z0237 of not more than 2 N/cm and self-adhesive strength between adhesive layers of not less than 2 N/cm on the surface of tape base material. The self-adhesive tape has type A durometer hardness by JIS K6253 of not less than 20. And the present invention also provides a method of utilizing self-adhesive tape wherein a part of or whole surface of an article is covered for reason of binding, laminating or packing the article by the self-adhesive tape and then one side of adhesive of a self-adhesive tape is adhered to another by pressure.

2 Claims, 2 Drawing Sheets

SELF-ADHESIVE TAPE AND METHOD OF USE THEREOF

BACKGROUND OF THE INVENTION

1. Field of the Invention

The present invention relates to a self-adhesive tape that can be used for binding, laminating, or packaging (referred to as binding hereinafter) and that is useful for binding various kinds of articles such as tubes for medical care, cables for office automation equipments and the like, wires, flowering plants, documentation, posters, etc., for laminating various kinds of articles such as tags attached to baggage of aviation, posters, photographs, etc. and, furthermore, for packaging to protect various kinds of articles such as glasswares, earthenwares, etc. from contamination or damage.

2. Description of the Prior Art

Binding tapes have been employed conventionally in order to bind a bundle of such as tubes, cables and wires, etc. A binding tape of this type does not adhere to surface of an object to be bound but only adhesive layers of a binding tape adheres together by pressure. Natural rubber, butyl rubber, polyisoprene rubber, and acrylic pressure-sensitive adhesives (tackiness agents) are used for the adhesive layer of conventional binding tapes.

However, conventional binding tapes have disadvantage that adhesive may be left on an article bound or adhesive may contaminate or discolor the article by deterioration with time, or that adhesive strength may be too strong for a delicate article such as paper so that paper is peeled off and torn upon removal. In addition, generally, discoloration and a decrease in adhesive strength readily occur after a long term storage of a tape itself and at the same time there is a problem that tapes with high transparency cannot be provided because of characters of pressure sensitive adhesive employed.

BRIEF SUMMARY OF THE INVENTION

Object of the Invention

The present invention is achieved in view of the situation of the above described conventional technology. The invention is to provide a self-adhesive tape that may prevent remaining of adhesive on an article bound and the like, discoloring or contaminating the article, and adhesion to the article, and prevent discoloring or a decrease in adhesive strength after long term storage of the tape itself and that has a highly transparent adhesive layer and a method of use.

Summary of the Invention

As a result of efforts by the present inventors to solve the above described problems, it was found that the object of the present invention is achieved by providing an adhesive layer comprising at least one adhesive selected from the group of polyurethane adhesives and polyester adhesives, and having a ball tackiness value of not more than 3, adhesive strength to a stainless steel board according to JIS Z0237 of not more than 2 N/cm, and self-adhesive strength between adhesive layers of not less than 2 N/cm on the surface of tape base material. And thus the present invention is completed.

That is to say, the present invention provides a self-adhesive tape having an adhesive layer comprising at least one adhesive selected from the group of polyurethane adhesives and polyester adhesives, and having a ball tackiness value of not more than 3, an adhesive strength value to stainless steel board in JIS Z0237 of not more than 2 N/cm and self-adhesive strength between adhesive layers of not less than 2 N/cm on the surface of tape base material.

The present invention also provides a self-adhesive tape having type A durometer hardness by JIS K6253 of not less than 20 in the above described self-adhesive tape.

The present invention also provides a method of using a self-adhesive tape, wherein a part of or whole surface of an article is covered for reason of binding, laminating or packing the article by the self-adhesive tape and then adhesive layers of a self-adhesive tape are crimped together.

The present invention will be explained in detail as follows.

DETAILED DESCRIPTION OF THE PREFERRED EMBODIMENTS

Figure 1:
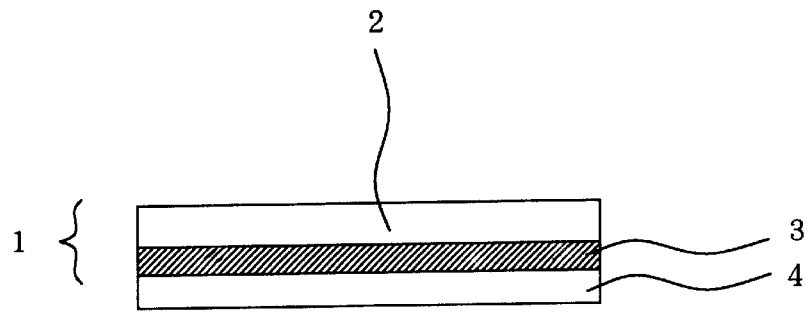
FIG. 1 shows a cross-section of a self-adhesive tape of one embodiment of the invention.

For example, in the present invention, various paper materials, metallic foils and a film and a sheet of plastic such as polyolefin resin such as polyethylene and polypropylene resin, polyester resin such as polybutylene terephthalate resin and polyethylene terephthalate resin, acetate resin, polystyrene resin, vinyl chloride resin are illustrated as tape base material. In the above described film and sheet materials, polyester resin film and sheet are preferable and especially polyethylene terephthalate resin film sheet are more preferable. The tape base material may consist of one layer or may have a multi-layer structure having two or more layers. The tape base material may be un-oriented or may be uniaxially oriented in either a longitudinal or a transverse direction or biaxially oriented. Furthermore, the tape base material is preferably transparent for the use of lamination. For packaging use, the tape base material is preferably film or sheet with an excellent cushioning property such as film or sheet of formed plastics such as foamed polyurethane resins, foamed polyester resins, foamed polyethylene resins, foamed polypropylene, and foamed polyethylene-ethylene vinyl acetate copolymers.

Thickness of the tape base material does not have any limitation. For binding and laminating usage generally, however, the thickness is in the range of 30 to 300 µm and preferably in the range of 50 to 200 µm, and for packaging usage, it is generally in the range of 0.5 to 10 mm and preferably in the range of 2 to 7 mm.

The tape base material may be colored or colorless and transparent. Moreover, general printing or character printing may be given on the surface of the backside or on the surface of the adhesive side of the tape base material. For this purpose a thermal recording layer, a print receiving layer allowing thermal transfer, ink jet, and laser printing, a printing performance improved layer etc. may be provided on the tape base material.

In addition, a release-coated layer may be formed on the surface of the opposite side to the adhesives layer side of the tape base material. As release agent used for the release coated layer, for example, known release agent such as silicones or non-silicone release agents such as polyvinyl carbamates, polyolefins and long-chain alkyl compounds can be used, but in the present invention non-silicones release agents are more preferable.

In the present invention, an adhesive layer is prepared on the surface of the tape base material comprising at least one adhesive selected from polyurethane adhesives and polyester adhesives, and an adhesion reinforcement layer may be prepared between the surface of the tape base material and the adhesive layer.

The adhesive layer in the present invention has characteristic to have extremely low tackiness, and a ball tackiness value is preferably not more than 3, and more preferably not more than 2. If a ball tackiness value exceeds 3, adhesive may remain on the surface of articles to be bound.

Moreover, the adhesive layer of the present invention has adhesive strength to a stainless steel board according to JIS Z0237 of not more than 2 N/cm, and preferably not more than 1.5 N/cm.

In addition, adhesive layer has self-adhesive strength between adhesive layers of not less than 2 N/cm, more preferably not less than 3 N/cm. The upper limit of the self-adhesive strength is not especially limited, but it is about 50 N/cm. Here the self-adhesive strength means self-adhesive strength 24 hours after adhesion by pressure.

Polyurethane adhesives have characteristic that strong self-adhesive strength is obtained immediately after adhesion between adhesive layers and the self-adhesive strength obtained maintains as it is. A polyester adhesive layer is easily peeled off immediately after adhesion between adhesive layers and the self-adhesion strength increases gradually.

Furthermore, type A durometer hardness according to JIS K6253 of the adhesive layer is preferably not less than 20, more preferably in the range of 30 to 100, and further preferably in the range of 40 to 80. When type A durometer hardness is less than 20, there is the fear that an adhesive may remain on articles bound. On the other hand, sufficient self-adhesive strength may not be provided when the hardness is more than 100.

A polyurethane adhesive employed in the above described adhesive layer is composed of a soft segment mainly composed of long-chain polyol and a hard segment composed of diisocyanate and chain extender. As long-chain polyols, polyester polyol, polyether polyol are mainly employed, and as diisocyanates, TDI (tolylene diisocyanate), MDI (diphenylmethane diisocyanate), HDI (hexamethylene diisocyanate) and the like are used. As chain extenders, low molecule polyalcohols and aromatic diamines, etc. are used.

As polyurethane adhesives, it is preferable to use polyurethane cured afterwards by adding a cross linking agent. Polyisocyanates are preferably used as a cross linking agent, and aliphatic or cycloaliphatic polyisocyanates are especially preferable in the light of weatherability. In addition, when a cross linking agent is used, it is preferable to use a cross-linking accelerator in combination.

Polyisocyanate-based cross linking agents are polyisocyanate compounds having not less than 2 of isocyante groups in a molecule. Examples of this kind of cross linking agents are shown below; 1,4-tetramethylene diisocyanate, hexamethylene diisocyanate, 2,2,4-trimethylhexane-1,6-diisocyanate, lysine methyl ester diisocyanate, p-phenylene diisocyanate, tolylene diisocyanate, biphenyl diisocyanate, 3,3'-dimethyl-4,4'-biphenylene diisocyanate, methylene bis (phenyl isocyanate), bis(isocyanate ethyl)phmalate, isophorone diisocyanate, methylcyclohexyl diisocyanate, 2-isocyanate ethyl-2,6-diisocyanatehexanoate. Moreover, modified isocyanate, for example, multi-functional isocyanate compounds with not less than 3 functional groups such as isocyanurate type and urethane type may be used. The amount of the cross linking agent is preferably in the range of 1 to 60 parts by weight based on the weight of 100 parts by weight of polyurethane, and more preferably in the range of 10 to 40 parts by weight.

Polyester adhesives of used in the above described adhesive layer have polyester resin as a resin component.

The polyester resin in the polyester adhesive is obtained by polycondensation of an acid component and a diol component. As the acid component, for example, aliphatic dicarboxylic acid and aromatic dicarboxylic acid may be mentioned, but these two types of dicarboxylic acids may be used in combination. When an aliphatic dicarboxylic acid and an aromatic dicarboxylic acid are used in combination, a ratio by weight of the aliphatic dicarboxylic acid and the aromatic dicarboxylic acid is preferably in the range of 5:95 to 50:50. As aliphatic dicarboxylic acids, for example, adipic acid, sebacic acid, azelaic acid and decane-1,10-dicarboxylic acid may be selected. As aromatic dicarboxylic acids, for example, terephthalic acid, isophthalic acid, phthalic acid, naphthalene-1,4-dicarboxylic acid, naphthalene-2,5-dicarboxylic acid, diphenylether-4,4'-dicarboxylic acid and diphenyldicarboxylic acid may be mentioned. As the diol component, for example, aliphatic diols and aromatic diols may be mentioned, but aliphatic diols are preferabe. One aliphatic diol may be used, but two or more, particularly two to four aliphatic diols are preferably used in combination. As aliphatic diols, for example, ethylene glycol, propylene glycol, trimethylene glycol, tetramethylene glycol, diethylene glycol, polyethylene glycol, polypropylene glycol, polytetramethylene glycol, hexamethylene glycol, dodecamethylene glycol and neo-pentyl glycol may be mentioned.

A cross linking agent may be added to polyester resin as a resin component in polyester adhesive. Polyisocyanate-based cross linking agent are preferably used. The polyisocyanate-based cross linking agents are the same as those described as the polyisocyanate-based cross linking agents used in polyurethanes may be used in polyesters. The amount of the cross linking agent is preferably in the range of 1 to 20 parts by weight based on the weight of 100 parts by weight of polyester, and more preferably in the range of 2 to 10 parts by weight.

A glass-transition temperature after cross-linking of the polyester resin and polyurethane resin used in the adhesive layer of the present invention is preferably in the range of −20° C. to +60° C.

In the above described adhesive layer, polyester adhesives and polyurethane adhesives may be used in combination. A ratio of combination of polyester adhesives and polyurethane adhesives compounds is preferably in the range of 5:95 to 95:5 by mass. A self-adhesive tape having desired self-adhesive strength can be obtained by using the two types of adhesives in combination.

The adhesive layer of the present invention has characteristic substantially not to contain a tackifier, an oil, a plasticizer, unlike conventional adhesive layers. Because of this, the adhesive layer of the present invention has superior chemical stability, and the surface of a bound article can be prevented from contamination.

In addition, the adhesive layer may contain at least one kind of other additives. As additives, dyestuffs, pigments, fillers, antioxidants and ultra-violet absorbents are mentioned as example. As fillers, zinc oxide, titanium oxide, silica, calcium carbonate, and barium sulfate are mentioned as example. As antioxidants, anilide-, phenol-, phosphite-, and thioester-based are mentioned as example. As ultra-violet absorbents, benzophenone- and bonzotriazole-based are selected as example.

Thickness of the adhesive layer does not have limitation particularly, but it is usually in the range of 5 to 40 $\mu$m, and preferably in the range of 10 to 25 $\mu$m.

In addition, since the adhesive layer of the present invention has printability of pictures and characters, it is possible to put printed pictures or characters on the surface of the adhesive layer.

In addition, the surface of the adhesive layer may be covered with a releasing sheet.

A releasing sheet is composed of a support base material having a releasing property at least on one side of the sheet. The side with releasing property of the support base material may be coated with a release agent or may not be coated.

As support base materials, for example, paper, plastic paper and plastic film are mentioned. For example, as paper, a glassine, polyethylene laminate paper are mentioned, and as plastic films, films of polyolefin resins such as polyethylene resin and polypropylene resin, and of polyester resin such as polybutylene terephthalate resin and polyethylene terephthalate resin, and of acetate resin, of polystyrene resin and of polyvinylchloride resin are selected. In addition, as a suitable operative example of the releasing sheet without a release agent coating, a polyolefin film such as polypropylene film, polyethylene film and paper and other film superposed by these polyolefin film are mentioned.

As a releasing finishing agent used for a releasing sheet, silicone resin, alkyd resin, fluorocarbon resin, and resin containg long-chain alkyl groups are mentioned.

Thickness of a releasing sheet is not particularly limited and may be chosen appropriately.

It is preferable for the self-adhesive tape of the present invention to have a form of a plane sheet or a rolled shape.

Figure 2:
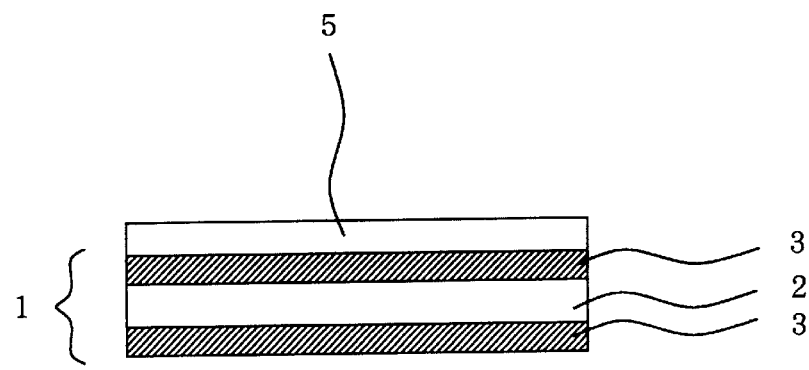
FIG. 2 shows a cross-section of self-adhesive tape of another embodiment of the present invention.

For the self-adhesive tape 1 of the present invention, only one side of a tape base material 2 may be superposed by an adhesive layer 3 as shown in FIG. 1, and both sides of the tape base material 2 may be superposed by the adhesive layer 3 respectively as shown in FIG. 2. In addition, as shown in FIG. 1, the surface of the adhesive layer may be covered by a releasing sheet 4. And also, as shown in FIG. 2, the surface of one adhesive layer may be covered by a double-sided releasing sheet 5.

The self-adhesive tape of the present invention may be employed in usage for self adhesion, namely various kinds of usage to utilize adhesion between adhesive layered planes, but it is particularly advantageous to be used in binding an article, laminating an article and packaging an article.

Application in binding an article, laminating an article and packaging an article are described based on figures.

Figure 3:
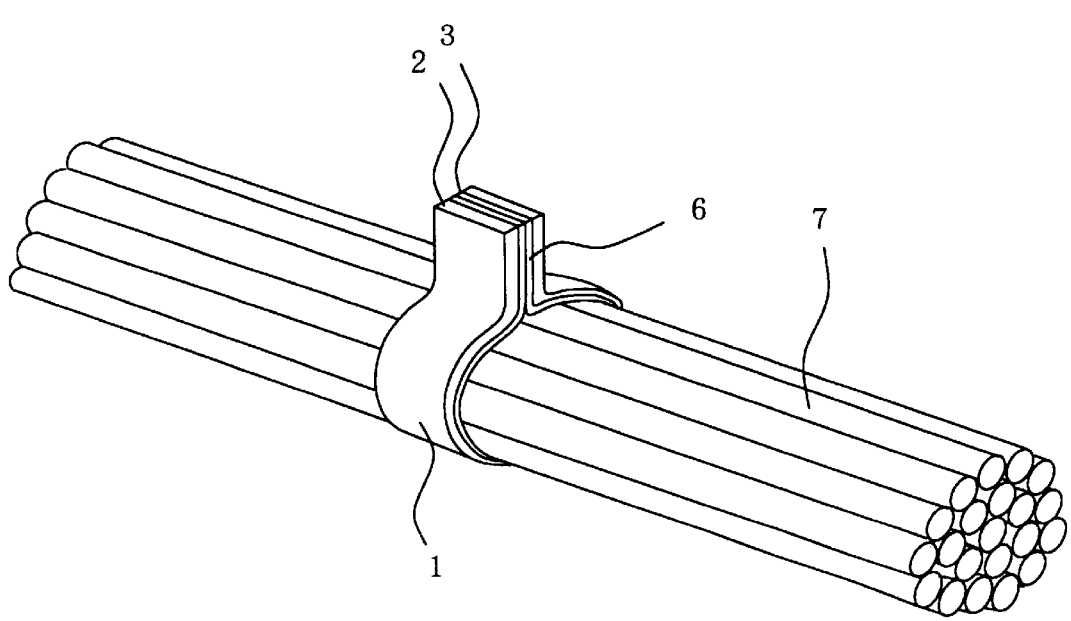
FIG. 3 is a perspective diagram showing a self-adhesive tape of one embodiment of the invention binding plurality of tubes.

FIG. 3 show situation that article is bound together. Self-adhesive tape 1 of a one side adhesive layer tape shown in FIG. 1 is wound around bundled cylindrical articles 7 of a lot of tubes, and the surface of adhesive layer 3 in one side of tape base material in both terminal parts 6 of self-adhesive tape 1 is put on top of one another and stuck by pressure.

Figure 4:
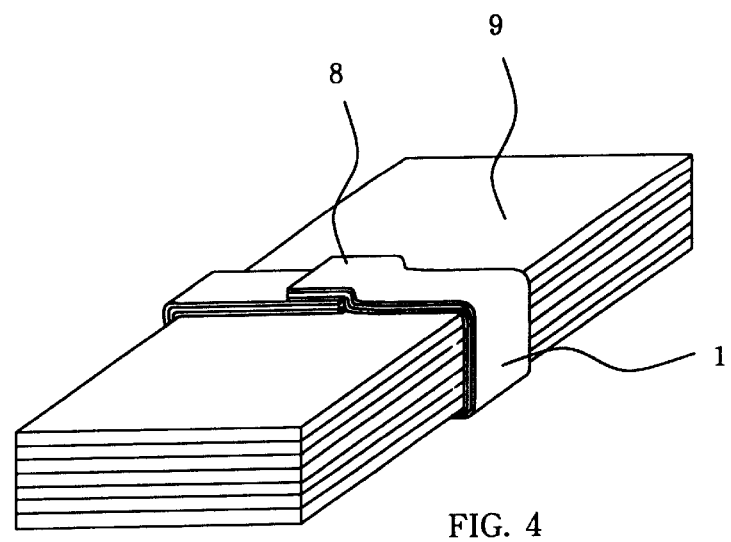
FIG. 4 is a perspective diagram showing a self-adhesive tape of one embodiment of the invention binding plurality of tabular articles.
Figure 5:
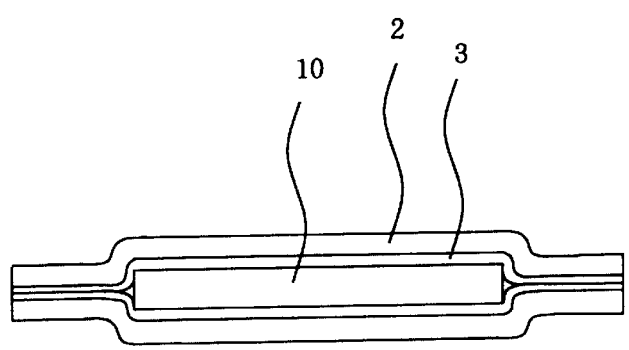
FIG. 5 is a perspective diagram showing a self-adhesive tape of one embodiment of the invention laminating a photograph.

FIG. 4 also shows a situation that another article is bound together. Self-adhesive tape 1 of double-sided adhesive layer type shown in FIG. 2 is wound around articles 9 of tabular good piled up, and adhesive layer 3 in face of front side of tape base material in one terminal part 8 of self-adhesive tape 1 and front side face of adhesive payer 3 in the back side of tape base material in another terminal part are stuck together by pressure. Thus in the case of self-adhesive tape of double-sided adhesive layer type, adhesion may be performed between two front sides of the tape mentioned above, between one front side and one back side or between two back sides. Moreover, when one self-adhesive tape of one side adhesive layer type is wound around articles, an adhesive layer side may be attached to surface of the articles or a tape base material side may be attached to surface of the articles with adhesive layer outside.

Articles bundled up are not particularly limited and various kinds of configuration such as tube, wire, paper and sheet are illustrated.

In a case that an article is laminated, an article such as photography 10 or poster is caught between two pieces of self-adhesive tape 1 of a one side adhesive layer type shown in FIG. 1 so that adhesive layered planes contact and stuck by pressure.

Figure 6:
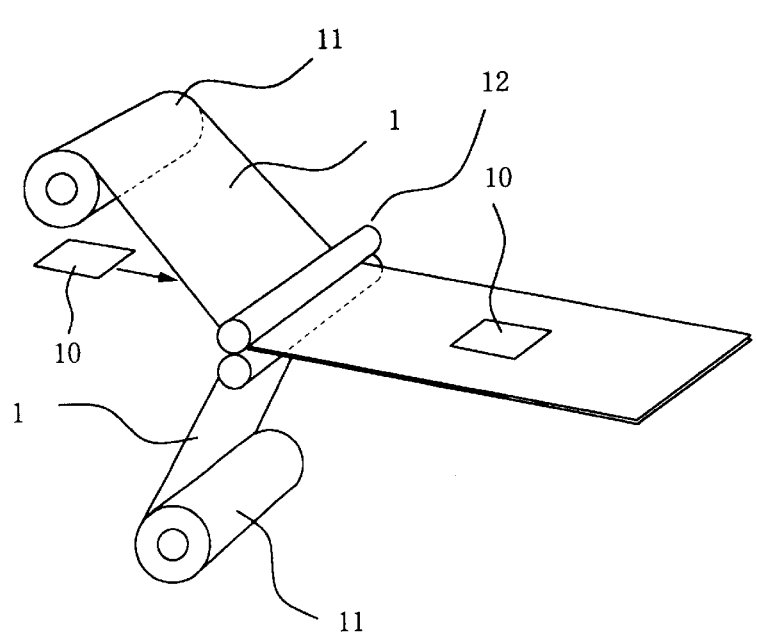
FIG. 6 is a schematic perspective diagram showing a method of laminating a photograph using a self-adhesive tape of one embodiment of the invention.

This lamination process is performed as shown in FIG. 6. Two pieces of self-adhesive tape 1 are fed out from two rolls 11 of a self-adhesive tape, and they are located so that adhesive layered planes face each other. Article such as photography 10 are inserted between two adhesive layers. The article caught between two pieces of self-adhesive tapes is laminated by laminate roll 12, subsequently is sealed from the upper and lower sides by pressure roll as necessary.

Packaging of articles may be performed in the same method as lamination of articles.

EXAMPLES

The present invention will be explained by an example more concretely in the next paragraph. In addition, the present invention was not restricted at all by these examples.

Adhesive strength measurement examination, self-adhesive strength measurement examination and ball tackiness measurement examination in examples were performed according to the methods as follows.

(1) Adhesive strength measurement examination:

Adhesive strength of an adhesive layer side of a self-adhesive tape was measured according to JIS Z 0237.8.3.1. Here stainless steel plate was used as testing board.

(2) Self-adhesive strength measurement examination immediately after crimp:

Two adhesive sides of self-adhesive tape were located facing together and crimped, and within 1 minute after crimp, the crimped adhesive layer side was peeled off (in T type peeling) at peeling rate of 300 mm/min. The load of peeling was measured.

(3) Self-adhesive strength measurement examination after crimp 24 hours:

The same peeling load measurement as in (2) was performed 24 hours after crimp.

(4) Ball tackiness measurement examination:

The ball tackiness of a self-adhesive tape was measured according to JIS Z0237.12. Measurement was performed under the condition of inclination angle of board of 30°, of temperature at 23° C. and of unit of ¹/₃₂ inch.

(5) Measurement examination of type A durometer hardness:

The type A durometer hardness of the adhesive layer was measured according to JIS K6253.5.4.

(6) Measurement examination of glass transition temperature:

Glass transition temperature of the adhesive layer was measured under nitrogen atmosphere, at temperature rise rate of 20° C./min., using differential calorimetry apparatus (by Perkin-Elmer Data Systems, type PYRIS-1).

Example 1

After an adhesive solution of polyester compounds was applied on one side of tape base material consisting of the foaming polyester film that could be printed (Toyobo Co., Ltd., Crisper, thickness 188 $\mu$m) to obtain thickness of the adhesive layer after drying of 20 $\mu$m, the layer was dried. The adhesive solution was prepared by adding cross linking agent of polyisocyanates compound (Dainichiseika Colour & Chemicals Mfg. Co., Ltd. SEIKABOND C-75N, non-volatile compound 75 weight %) 5 weight part to polyester resin of phthalic acid compound (Dainichiseika Colour & Chemicals Mfg. Co., Ltd. SEIKABOND E-295, non-volatile compound 60 weight %) 100 weight part. In the next step, the adhesive layer was covered with a releasing sheet consisting of polyethylene terephthalate film of thickness 38 $\mu$m, and a self-adhesive tape was made.

The adhesive strength of the adhesive layer of polyester compounds measured according to JIS Z0237.8.3.1 was 0.2 N/cm. In addition, self-adhesive strength between adhesive layers immediately after crimping was 0.7 N/cm, and the self-adhesive strength after crimping of 24 hours was 6.7 N/cm. In addition, the ball tackiness value of the adhesive layer was 2. Furthermore, the type A durometer hardness of the adhesive layer was 40. In addition, the glass transition temperature of the provided polyester adhesives layer was −14° C.

As a result that this self-adhesive tape was used in order to bind cable of office automation equipment together, it became clear excellent workability and strong adhesion force at the bound part were provided. Furthermore, after about 1 year of banding together, when this self-adhesive tape was removed, adhesive residue, contamination of cable, and discoloration were not observed at the bound portion.

Example 2

A solution of polyurethane adhesives compounds was applied on one side of the same tape base material as Example 1 to obtain thickness of the adhesive layer after drying of 12 $\mu$m, and then dried. The above described polyurethane adhesives compounds was prepared by mixing cross linking agent of polyisocyanate compounds (Dainichiseika Colour & Chemicals Mfg. Co., Ltd. RESAMINE NE, non-volatile compound 75 weight %) of 30 weight part and accelerant of amine/tin compounds (Dainichiseika Colour & Chemicals Mfg. Co., Ltd. RESAMINE HI215 accelerant, non-volatile compound 5 weight %) of 0.5 weight part to polyurethane resin (Dainichiseika Colour & Chemicals Mfg. Co., Ltd. RESAMINE UD8300LP, non-volatile compound 50 weight %) of 100 weight part. In the next step, the adhesive layer was covered with an releasing sheet consisting of biaxially-oriented polypropylene film of thickness 40 $\mu$m, and a self-adhesive tape was obtained.

The adhesive strength of the polyurethane adhesives compounds layer measured according to JIS Z0237.8.3.1 showed 0 N/cm. In addition, self-adhesive strength between adhesive layers immediately after crimping was 7.5 N/cm, and the self-adhesive strength after crimping of 24 hours was 8.2 N/cm. In addition, the ball tackiness value of the adhesive layer was 2. Furthermore, the type A durometer hardness of the adhesive layer was 78. In addition, the glass transition temperature of the provided polyurethane adhesives layer was +46° C.

Bar code was printed on the surface of tape base material of this self-adhesive tape, and a handbag part of a leather bag was bound by this tape to give a tag. The tag was easily installed without remainder of adhesive on the surface of the leather bag. After one month use, neither of adhesive residue on the leather of the bag, color change nor staining was not observed.

Example 3

The same adhesive layer as in example 1 was applied on a face of biaxially-oriented polypropylene (OPP film, thickness 60 $\mu$m) which one side was corona treated, used as tape base material, and thus a self-adhesive tape of constitution of FIG. 1 was provided.

The adhesive strength of the polyester adhesives layer measured according to JIS Z0237.8.3.1 was 1.2 N/cm. In addition, self-adhesive strength between adhesive layers immediately after crimping was 1.7 N/cm, and the self-adhesive strength after crimping of 24 hours was 3.2 N/cm. In addition, the ball tackiness value of the adhesive layer was 2. Furthermore, the type A durometer hardness of the adhesive layer was 40.

As a result that this self-adhesive tape was used in order to bind cable of office automation equipment together, it became clear excellent workability and strong adhesion force at the bound part were provided. Furthermore, after about 1 year of banding together, when this self-adhesive tape was removed, adhesive residue, contamination of cable, and discoloration were not observed at the bound portion.

Example 4

A self-adhesive tape of constitution of FIG. 1 was provided by applying the same adhesive layer as in Example 2 on corona treated face of the same tape base material as in Example 3.

The adhesive strength of the polyurethane adhesives compounds layer measured according to JIS Z0237.8.3.1 was 0.01 N/cm. In addition, self-adhesive strength between adhesive layers immediately after crimping was 3.1 N/cm, and the self-adhesive strength after crimping of 24 hours was 3.3 N/cm. In addition, the ball tackiness value of the adhesive layer was 2. Furthermore, the type A durometer hardness of the adhesive layer was 78.

As a result that this self-adhesive tape was used in order to bind cable of office automation equipment together, it became clear excellent workability and strong adhesion force at the bound part were provided. Furthermore, after about 1 year of banding together, when this self-adhesive tape was removed, adhesive residue, contamination of cable, and discoloration were not observed at the bound portion.

Example 5

The same method as in Example 1 was performed to obtain a self-adhesive tape of constitution of FIG. 1, except that, as adhesive employed in the adhesive layer, the solution mixture of phthalic polyester resin (Dainichiseika Colour & Chemicals Mfg. Co., Ltd. SEIKABOND E-295, non-volatile compound 60 weight %) of 50 weight part, polyurethane resin (Dainichiseika Colour & Chemicals Mfg. Co., Ltd. RESAMINE UD8300LP, non-volatile compound 50 weight %) of 50 weight part and cross linking agent of polyisocyanate compounds (Dainichiseika Colour & Chemicals Mfg. Co., Ltd. RESAMINE NE, non-volatile compound 75 weight %) of 5 weight part was used.

The adhesive strength of the polyester adhesives layer measured according to JIS Z0237.8.3.1 was 0.1 N/cm. In addition, self-adhesive strength between adhesive layers immediately after crimping was 3.0 N/cm, and the self-adhesive strength after crimping of 24 hours was 4.9 N/cm. In addition, the ball tackiness value of the adhesive layer was 2. Furthermore, the type A durometer hardness of the adhesive layer was 52.

As a result that this self-adhesive tape was used in order to bind cable of office automation equipments together, it became clear excellent workability and strong adhesion force at the bound part were provided. Furthermore, after about 1 year of banding together, when this self-adhesive tape was removed, adhesive residue, contamination of cable, and discoloration were not observed at the bound portion.

Example 6

The adhesive layer the same as in Example 2 was formed onto both sides of polyethylene terephthalate film (a thickness 25 μm). Biaxially-oriented polypropylene film (oji Paper Co., Ltd. ALFAN PP40PU002,) was employed as a releasing sheet, and a self-adhesive tape of constitution of FIG. 2 was obtained.

The adhesive strength of the polyurethane adhesives compounds layer measured according to JIS Z0237.8.3.1 was 0 N/cm. In addition, the ball tackiness value of the adhesive layer was 2. Furthermore, the type A durometer hardness of the adhesive layer was 78. In addition, neither self-adhesive strength between adhesive layers immediately after crimping nor self-adhesion strength after crimping of 24 hours could not be measured, because tape base material of polyethylene terephthalate film was broken when peeled. The self-adhesive strength of the tape base material when broken was 5.9 N/m.

The two sides of adhesive layers of the self-adhesive tape were attached together in the manner of FIG. 4, and excellent adhesion was obtained at crimped double-layered area without adhesion onto article.

Example 7

A self-adhesive tape of constitution of FIG. 1 was provided by applying the same adhesive layer (thickness 20 μm) as in Example 2 on one side of a foaming polyethylene sheet (thickness 5 mm) as tape base material.

The adhesive strength of the polyurethane adhesives compounds layer measured according to JIS Z0237.8.3.1 was 0 N/cm. In addition, the ball tackiness value of the adhesive layer was 2. Furthermore, the type A durometer hardness of the adhesive layer was 78. In addition, neither self-adhesive strength between adhesive layers immediately after crimping nor self-adhesive strength after crimping of 24 hours could not be measured, because the self-adhesion strength was bigger than that of tape base material of foaming polyethylene sheet and the sheet was broken when peeled. The self-adhesive strength of the tape base material when broken was 2.5 N/m.

The whole of glass vessel was covered with this self-adhesive tape. Upper and lower adhesive layered planes were attached together and crimped, and thus this article was packaged. As a result an article was fixed well, and, furthermore, by virtue of a cushion effect of foam, the article could be transported without any damage. Packaged article after transportation could be unpacked and proved to be free of staining.

Example 8

The self-adhesive tape of Example 3 was rolled up to obtain two rolls of self-adhesive tape original piece. Two pieces of self-adhesive tape were fed out from the two rolls in the manner that the two sides of adhesive was faced and between the two adhesive layers was inserted a photograph. Then the two tapes were crimped, and as a result laminated photograph was easily obtained. In addition, discoloration or staining of photograph was not observed after 1 year.

The self-adhesive tape of the present invention can prevent adhesive residue on a bound, laminated or packaged article, discoloring or contaminating the article, and adhesion to the article. Furthermore, the self-adhesive tape of the present invention can prevent self-discoloring or a decrease of adhesive strength after long term storage and was able to achieve highly transparent adhesive layer.

What is claimed is:

1. A method of use of a self-adhesive tape, wherein a part or whole of a surface of an article is covered by the self-adhesive tape for the purpose of binding, laminating or packaging the article and adhesive layer sides of the self-adhesive tape are crimped together, said self-adhesive tape having an adhesive layer comprising at least one adhesive selected from polyurethane adhesives and polyester adhesives, having a ball tackiness value of not more than 3, adhesive strength to a stainless steel board according to JIS Z0237 of not more than 2 N/cm, and self-adhesive strength between adhesive layers of not less than 2 N/cm is provided on a tape base material.

2. The method and use of a self-adhesive tape according to claim 1, wherein type A durometer hardness according to JIS K6253 of said adhesive layer is not less than 20.

* * * * *